(12) United States Patent
Mueller et al.

(10) Patent No.: US 9,740,584 B2
(45) Date of Patent: Aug. 22, 2017

(54) METHOD AND DEVICE FOR TESTING A COMPUTER CORE IN A PROCESSOR HAVING AT LEAST TWO COMPUTER CORES

(75) Inventors: Bernd Mueller, Leonberg (DE); Axel Aue, Korntal-Muenchingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 407 days.

(21) Appl. No.: 13/124,445

(22) PCT Filed: Sep. 3, 2009

(86) PCT No.: PCT/EP2009/061412
§ 371 (c)(1),
(2), (4) Date: Jun. 30, 2011

(87) PCT Pub. No.: WO2010/043448
PCT Pub. Date: Apr. 22, 2010

(65) Prior Publication Data
US 2011/0251821 A1    Oct. 13, 2011

(30) Foreign Application Priority Data
Oct. 16, 2008  (DE) .................. 10 2008 042 894

(51) Int. Cl.
*G06F 11/22* (2006.01)
(52) U.S. Cl.
CPC ................. *G06F 11/2236* (2013.01)
(58) Field of Classification Search
CPC ...... G01R 31/31717; G01R 31/318547; G06F 11/267; G06F 2221/2115; G06F 2221/2129; G06F 11/0724; G06F 11/0739; G06F 11/0751; G06F 11/27; H04L 63/12; H04W 12/06; H04W 12/10
USPC .................................................. 710/260–265
See application file for complete search history.

(56) References Cited

U.S. PATENT DOCUMENTS

| 4,803,683 A | 2/1989 | Mori et al. |
|---|---|---|
| 6,115,763 A * | 9/2000 | Douskey et al. ............... 710/72 |
| 6,304,983 B1 * | 10/2001 | Lee et al. ........................ 714/48 |
| 6,560,720 B1 | 5/2003 | Chirashnya et al. |
| 6,996,758 B1 * | 2/2006 | Herron et al. ................. 714/726 |
| 2003/0060189 A1 * | 3/2003 | Minear et al. ................ 455/411 |

(Continued)

FOREIGN PATENT DOCUMENTS

| DE | 3629178 | 3/1987 |
|---|---|---|
| DE | 102006014267 | 10/2007 |

(Continued)

*Primary Examiner* — Gregory J Toatley
*Assistant Examiner* — Kyle R Quigley
(74) *Attorney, Agent, or Firm* — Norton Rose Fulbright US LLP; Gerard Messina

(57) ABSTRACT

A method and a device for testing a computer core in a processor having at least two computer cores is described. The computer cores are connected to each other via an internal connecting system, both computer cores contributing toward the operating sequence of a machine. In the method for testing a computer core, with which a high error detection rate may be achieved in a minimum outlay of time, a test is run in one computer core, while a program for executing the driving operation of the motor vehicle is being processed in the other computer core at the same time.

26 Claims, 2 Drawing Sheets

(56) References Cited

U.S. PATENT DOCUMENTS

| | | | |
|---|---|---|---|
| 2005/0240850 A1* | 10/2005 | Ohwada et al. | 714/738 |
| 2008/0017173 A1* | 1/2008 | Fujii | 123/478 |
| 2009/0013217 A1* | 1/2009 | Shibata et al. | 714/47 |
| 2009/0300420 A1 | 12/2009 | Aue | |
| 2009/0327555 A1* | 12/2009 | Railing | G06F 13/26 710/267 |

FOREIGN PATENT DOCUMENTS

| | | |
|---|---|---|
| JP | 62-52643 | 3/1987 |
| JP | 8-95601 | 4/1996 |
| JP | 10-11319 | 1/1998 |

\* cited by examiner

METHOD AND DEVICE FOR TESTING A COMPUTER CORE IN A PROCESSOR HAVING AT LEAST TWO COMPUTER CORES

FIELD OF THE INVENTION

The present invention relates to a method for testing a computer core in a processor having at least two computer cores, the computer cores being linked together via an internal connecting system, both computer cores contributing toward the operating sequence of a machine, as well as a device for performing the method.

BACKGROUND INFORMATION

Integrated circuits are tested for their functionality by the semiconductor manufacturer. This is also true in particular of computer cores, which must be tested for their functionality for safety reasons. This is done in the uninstalled state after manufacturing a microprocessor on a semiconductor chip at the semiconductor manufacturer's, where the computer core has not yet been installed in a control unit.

German Patent Application No. DE 10 2006 014 267 A1 describes a method for testing at least one processor installed in a control unit, in which test data are loaded via a control unit interface for testing a first processor, and then the first test data loaded are stored in the memory unit of the second processor. The first processor is then switched by the second processor to a test mode, in which the first test data are used. The test results of the first processor are checked for plausibility by the second processor.

However, only a certain degree of error recognition is ensured by these tests because such a test is allowed to block a processor only for a short period of time. Since the processor must be available again without restrictions immediately after the test, the test patterns that may be used and thus the error coverage are limited.

SUMMARY

An object of the present invention is to provide a method and a device for testing a computer core, in which high error coverage is achieved with a minimal expenditure of time.

The example method according to the present invention for testing a computer core may have the advantage that the test coverage is increased and the tests are allowed to run uninterrupted for a longer period of time so that better test patterns may be used. Hardware defects are thus reliably eliminated. Due to the fact that one computer core is being tested during the operating sequence of a machine, while the other computer core is processing its normal program sequence, it is thus possible to use the test in real-time systems. The software controlling the operating sequence still remains capable of acting without a change during the test and may even be used to generate the test patterns, so that a greater variety of test patterns may be used.

A test is advantageously running in one computer core while a program for performing the operating sequence of the machine is being processed in the other computer core at the same time. In this way, not only the operating sequence but also safety during operation of the machine are ensured without interruption because the machine maintains its functionality during the test.

In one refinement, a test inquiry is output to initiate the test on both computer cores, so that after consent of both computer cores to this test inquiry, a first computer core is put in a test mode and the second computer core sends test data to the first computer core, and after the test has run, the correctness of the test results of the first computer core is checked. The test inquiry ensures that the test is introduced into the operating sequence at such a point in time that the functionality of the machine remains undisturbed. Such a test inquiry is easily implemented by requiring the two computer cores to consent to a condition at the same time.

If the test inquiries in a periodic system are also posed periodically, it is then possible to determine a favorable point in time for the test already when no data have yet been sent or received (offline).

The computer core advantageously triggers the test, which first detects the consent of both computer cores to the test inquiry. Alternatively, the computer core will trigger the test, which evaluates the response of the computer cores to the test inquiry at a predefined point in time. One computer core will then always check the consent of the computer cores to the test inquiry at a predefined point in time, which thus ensures that the test will also actually be performed immediately after consent.

In one refinement of the present invention, to perform the test, the first test data are first loaded from a memory. The first computer core is then switched to a test mode by making a scan chain of the first computer core accessible. The first test data are then shifted through the scan chain of the first computer core with the aid of the second computer core, so that the test results for the first computer core are made available. The second computer core then checks the plausibility of the test results obtained for the first computer core. A scan chain is formed by connecting internal flip-flops of the computer core to form shift registers. Because of this simple method, it is possible to use test patterns also during testing of the computer core on a running machine such as those already being used by semiconductor manufacturers under production conditions in the manufacture of processors. The creation of new test patterns may thus be largely omitted. Test patterns which may be used include the stuck-at test patterns and the path-delay test patterns, which allow high test coverage of the processor during operation.

In one embodiment, the first test data are read out of an internal memory of the processor containing the computer cores. This eliminates the need for additional memory units.

However, there is also the possibility that the test data will be read out of another control unit of the machine. The advantage of utilizing memories which are already available for storage of test data and omitting an additional memory is also utilized here.

The test data for performing the test are advantageously varied, so that various hardware components may be checked for their functionality by using different test data. There is no hardware-related restriction on the number of patterns. The number of patterns used is thus adjustable by using the same hardware merely through the configuration of the software. In the case of tests performed periodically or at least at predefined intervals, it is possible to use different test patterns each time the test is performed.

In one refinement of the present invention, during the sequence of the test on the first computer core, at least portions of the program sequences of the tested computer core required for the operating sequence of the machine are processed by another computer core. This ensures that important program parts, the interruption of which would result in a disturbance in the operating sequence of the machine, will be processed rapidly. The operator of the machine or the running application will not notice any difference in the process sequence of the machine, although the first computer core to be tested is not available for the program sequence during the test.

In the case of program parts whose processing does not have any urgent function relevance and/or safety relevance for the machine, the operating sequences from the operating sequence of the machine, directed at the first computer core during the sequence of the test on the first computer core, are stored and processed only when the computer core has resumed its normal operation after the test.

In one further embodiment, the test is performed in a predefined time slot of the computer core. Through the choice of a favorable time slot in which the test is performed, both the reconfiguration effort as well as the time spent for processing the unprocessed software, which to a certain extent corresponds to a disturbance in the normal sequence of the software on the corresponding computer core, may be minimized.

This may be accomplished in a particularly simple manner in the case of a time-controlled computer core if the time slot is placed in an idle phase of the computer core. It is thus possible to use a particularly quiet time slot for an active or passive test.

In the case of an event-controlled program sequence in the computer core, the test is performed on a predefined event after the conclusion. In doing so, this makes use of the fact that the next event after one event is still a relatively long way off in time, so it is appropriate to retrieve the test after such a point in time.

In another refinement of the present invention, in a method for testing a computer core a test is run in one computer core in a processor having at least two computer cores, the computer cores being interconnected via an internal connecting system and both computer cores make a contribution toward the driving operation of a motor vehicle, while a program for executing the driving operation of the motor vehicle is being processed in the other computer core at the same time.

This has the advantage that the test of the available hardware may be performed not only under real-time conditions but also under automotive boundary conditions without resulting in interference in the driving operation of the motor vehicle. The test thus meets the safety-relevant requirements in the motor vehicle in particular. It is no longer necessary to test the control unit containing the processor having the computer cores in a workshop or testing may be simplified because sources of error are recognized and displayed even during driving operation.

In one embodiment, one computer core tests the other computer core during driving operation of the motor vehicle. While the computer core which is being tested at this time is not available for the program sequences of the driving operation, the other computer core takes over the vehicle-relevant program sequences. The user of the vehicle is therefore not aware of the test sequences.

During initialization of the motor vehicle, while a power-intensive test for the first computer core is being performed, the other computer cores are advantageously put into a power-saving mode. This may be accomplished by reducing the clock frequency, for example, or by suppressing certain software accesses to cache memories.

In another refinement of the present invention, in the case of a device for testing a computer core in a processor having at least two computer cores, where the computer cores are interconnected via an internal connecting system and both computer cores may make a contribution toward the driving operation of a motor vehicle, an arrangement is provided with the aid of which a test is run in one computer core while a program for executing the driving operation of the motor vehicle is being processed in the other computer core at the same time.

This device allows a test during the use of a running control unit, the driving operation of the motor vehicle being maintained during the test. High error coverage is achieved with minimal effort in this test.

BRIEF DESCRIPTION OF THE DRAWINGS

The present invention allows numerous specific embodiments. One of these is explained in greater detail below on the basis of the figures.

DETAILED DESCRIPTION OF EXAMPLE EMBODIMENTS

Figure 1:
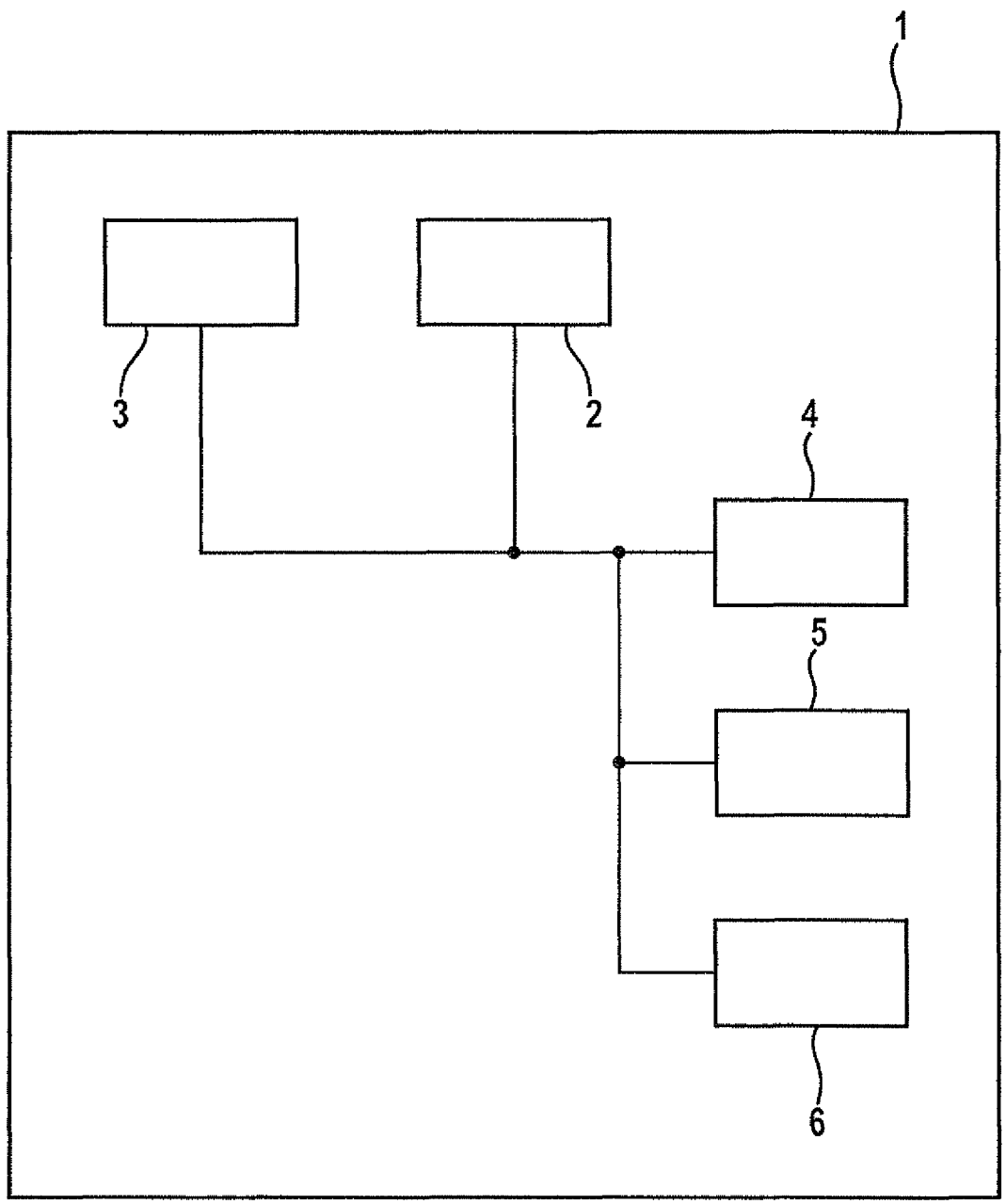
FIG. 1 shows a basic diagram of a processor in a control unit of a motor vehicle.

FIG. 1 shows a processor 1, such as that used in a control unit of a motor vehicle. Processor 1 in the present case has two computer cores 2 and 3, but it may also have multiple computer cores as needed. In addition, a RAM 4, a ROM 5, and a flash memory 6 are also contained in processor 1. Computer cores 2 and 3 as well as RAM 4, ROM 5, and flash memory 6 communicate with one another via an internal connecting system 7, for example, a bus.

Figure 2:
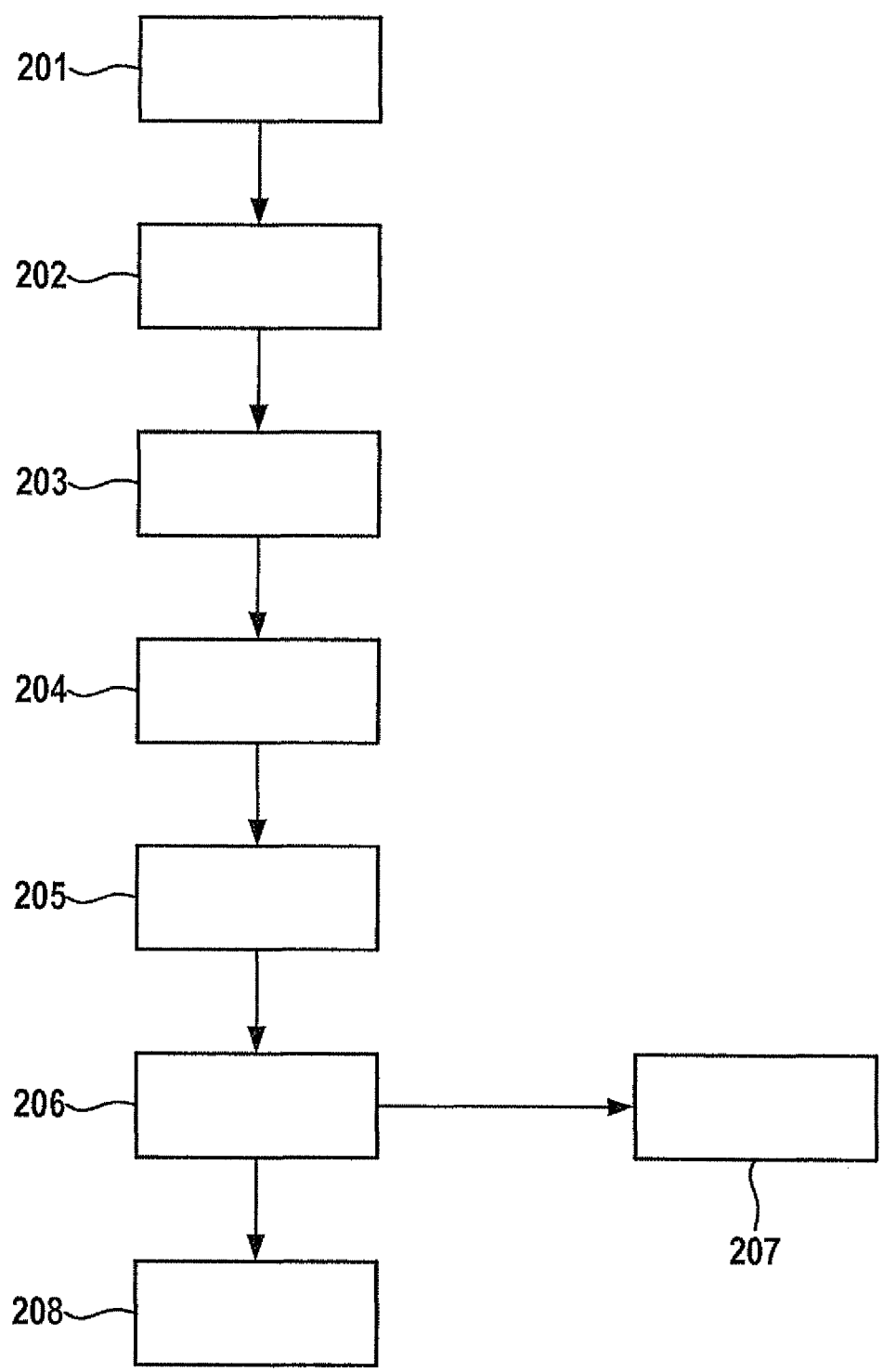
FIG. 2 schematically shows a flow chart of an exemplary embodiment of the method according to the present invention.

As FIG. 2 shows, the control unit is running in step 201 during driving operation of the motor vehicle. Computer core 2 is responsible here for the program sequences of electronic stability program ESP of the motor vehicle, while computer core 3 is responsible for the program sequences of fuel injection of the engine control.

To detect during driving operation whether computer cores 2, 3 are functioning properly, a test inquiry is sent in step 202 from one computer core 2 to the other computer core 3 via the software to detect whether a test of one of computer cores 2, 3 is still possible at this point in time. It is also proposed which computer core 2, 3 is to be tested and which computer core 2, 3 will accept the tasks of tested computer core 2, 3 accordingly during the test. There are a number of possibilities for doing so. Counters, a RAM element, or special registers may be used to detect whether both computer cores 2, 3 are consenting to a condition at the same time.

In step 203, the test inquiry is evaluated by computer cores 2, 3 to ascertain whether a test may be performed during the prevailing driving situation. One possible criterion may be derived from the required computer power, which depends on the rotational speed, for example. First computer core 2 will test the engine speed, for example. If the engine speed exceeds a rotational speed of 3000 rpm, then computer core 2 will deny its consent to a test. If the engine power is below the rotational speed of 3000 rpm, computer core 2 will consent to the test.

Another possible criterion is the probability of an interrupt. This depends on the injections, for example. The computer core in this case checks on the point in time of the last fuel injection. If such an injection has just taken place, the computer core will consent to the test because the next injection is still a relatively long time away. However, if the last injection was already a certain time ago, the computer core will refuse the consent to a test because it must expect another injection soon. As shown by the explanations, whether computer cores 2, 3 will consent to the test inquiry and which of computer cores 2, 3 will be tested depend on the operating sequence prevailing at the point in time of the inquiry. The criteria for consent should be implemented in the software and will depend on the application.

When the test is to be performed is established in step 204. This test is necessary in explicit form if the test is not to be performed immediately after mutual consent. Thus, for example, the aforementioned counters, RAM elements or special registers may be used to establish this point in time during operation.

In a time-controlled system, which is typically periodic, it is possible to establish offline when or in which time slots the corresponding test is to be performed. During operation, there is then only the task of identifying the next such point in time.

In such a system, the inquiry from step 202 is advantageously posed already at such a point in time that the test performance may follow directly.

In an event-controlled system, good points in time occur directly after a certain event. This is true, for example, when it is possible to predict from the system information that the next event to be processed is a sufficient time in the future.

The establishment of the time (step 204) takes place during operation, i.e., online. It is very advantageous here if the conditions are already analyzed at the programming point in time, so that only the simplest possible routine need take place during operation.

Next, in step 205, the test is initiated by computer core 2, 3, which was proposed as the testing core in step 202. In this case it is computer core 2 which notifies computer core 3 via an interrupt, for example, that it is triggering the test.

To perform the test, the test data are first loaded out of a flash memory 6 or ROM memory 5 of processor 1. A wide variety of test patterns may be used here. Under some circumstances, it is possible to avoid creating new test patterns if the stuck-at test patterns and the path-delay test patterns from semiconductor production are used. The stuck-at test is a static test in which the register contents are altered. The path-delay test pattern is a dynamic test in which the shift time of the register is varied. If the shift time is too short, there will not be any shifting of the register contents, which results in error detection.

After retrieval of the test data, computer core 3 is switched to a test mode in which the scan chain of computer core 3 is accessible. Next the first data of the test pattern are advantageously shifted through the scan chain of computer core 3 with the aid of computer core 2, so that the test results for computer core 3 are made available (step 206). Alternatively, the test patterns may also be shifted through the scan chain of the computer core by a hardware unit provided for this purpose.

If tasks for computer core 3 to be tested arrive during the test, they are checked for urgency in step 207. If this task must be executed rapidly, such as an unexpected injection in the case of the engine control, an interrupt is relayed to computer core 2, which will then execute this after a reconfiguration. If the present task is a non-time critical task, it is advantageously stored temporarily in RAM memory 4 via the operating system until computer core 3 has again resumed its normal program sequences after the test and then this task is processed.

If the test is concluded, computer core 2, for example, then checks the test results obtained for computer core 3 for plausibility and, if necessary, prompts the output of an error signal (step 208). Alternatively, the test may also be performed by a special hardware unit assigned to computer core 2.

The example method according to the present invention is not limited to only processors having two computer cores, but it may also be performed in processors having multiple computer cores.

What is claimed is:

1. A method for testing a computer core in a processor having at least two computer cores, the computer cores being interconnected via an internal connecting system, and both computer cores making a contribution toward an operating sequence of a machine, the method comprising:
   performing a first test by:
   posing a first test inquiry to both of the computer cores, wherein the first test inquiry proposes that a first one of the computer cores be tested by a second one of the computer cores; and
   in response to both computer cores consenting to the first test inquiry:
   putting the first one of the computer cores in a test mode;
   sending first test data from the second one of the computer cores to the first one of the computer cores; and
   using the second one of the computer cores to check the correctness of test results of the first one of the computer cores after termination of the first test,
   wherein the performing of the first test occurs during the operating sequence of the machine and while a first program for executing the operating sequence of the machine is being processed in the second one of the computer cores;
   wherein the computer cores are configured to simultaneously contribute to the operating sequence of the machine when neither of the computer cores is being tested;
   wherein the machine is a motor vehicle;
   wherein the consenting of both computer cores to the first test inquiry includes a determining, during a current driving operation of the motor vehicle, by both computer cores that the test inquiry can be performed without disturbing the driving operation of the motor vehicle;
   wherein at least one of the computer cores denies consent if one of an engine rotational speed is above a threshold speed and if an immediately previous instance of fuel injection occurred more than a predetermined period of time ago.

2. The method as recited in claim 1, wherein the first test is performed by a hardware unit provided for that purpose.

3. The method as recited in claim 1, wherein the first test inquiry is posed periodically.

4. The method as recited in claim 1, wherein the second one of the computer cores triggers the first test, which first detects the consent of both of the computer cores to the first test inquiry.

5. The method as recited in claim 1, wherein the second one of the computer cores triggers the first test which, at a predefined point in time, evaluates responses of the computer cores to the first test inquiry.

6. The method as recited in claim 1, wherein the performing of the first test includes:
   loading the first test data from a memory into the second one of the computer cores in preparation for the sending of the first test data from the second one of the computer cores to the first one of the computer cores;

switching the first one of the computer cores to the test mode by the second one of the computer cores in that a scan chain of the first one of the computer cores is made accessible; and performing the sending of the first test data by shifting the first test data through the scan chain of the first one of the computer cores with the aid of the second one of the computer cores, therein causing the first computer core to output the test results;

wherein the step of using the second one of the computer cores to check the correctness of test results of the first one of the computer cores involves a plausibility check.

7. The method as recited in claim 6, wherein the first test data are read out of an internal memory of the processor containing the computer cores.

8. The method as recited in claim 6, wherein the first test data are read out of another control unit of the machine.

9. The method as recited in claim 6, wherein at least one of the computer cores is tested more than once by another one of the computer cores, and wherein test data for performing a test vary between different tests of a same computer core.

10. The method as recited in claim 1, wherein at least portions of program sequences of the first one of the computer cores required for the operating sequence of the machine are processed by the second one of the computer cores during the first test.

11. The method as recited in claim 1, wherein command sequences from the operating sequence of the machine, directed to the first one of the computer cores during the first test, are stored.

12. The method as recited in claim 1, wherein the first test is performed in a predefined time slot of the computer cores, and wherein the time slot is predefined by the machine.

13. The method as recited in claim 12, wherein the predefined time slot is in an idle phase of whichever core is being tested.

14. The method as recited in claim 1, wherein the first test is performed following a predefined event, and wherein the event is predefined by the machine.

15. A method for testing a computer core in a processor having at least two computer cores, the computer cores being interconnected via an internal connecting system, and both computer cores making a contribution toward a driving operation of a motor vehicle, the method comprising:
performing a first test by:
posing a first test inquiry to both of the computer cores, wherein the first test inquiry proposes that a first one of the computer cores be tested by a second one of the computer cores; and
in response to both computer cores consenting to the first test inquiry:
putting the first one of the computer cores in a test mode;
sending first test data from the second one of the computer cores to the first one of the computer cores; and
using the second one of the computer cores to check the correctness of test results of the first one of the computer cores after termination of the first test,
wherein the performing of the first test occurs during the driving operation of the motor vehicle and while a first program for executing the driving operation of the motor vehicle is being processed in the second one of the computer cores; and
wherein the computer cores are configured to simultaneously contribute to the driving operation of the motor vehicle when neither of the computer cores is being tested,
wherein the consenting of both computer cores to the first test inquiry includes a determining, during the driving operation of the vehicle, by both computer cores that the test inquiry can be performed without disturbing the driving operation of the motor vehicle,
wherein at least one of the computer cores denies consent if one of an engine rotational speed is above a threshold speed and if an immediately previous instance of fuel injection occurred more than a predetermined period of time ago.

16. The method as recited in claim 15, wherein during initialization of the motor vehicle, while a power-intensive test for the first one of the computer cores is being performed, the second one of the computer cores is put into a power saving mode.

17. A device for testing a computer core in a processor having at least two computer cores, the computer cores being interconnected via an internal connecting system, the two computer cores making a contribution toward a driving operation of a motor vehicle, the device comprising:
an arrangement adapted to perform a first test, wherein the performing of the first test includes:
posing a first test inquiry to both of the computer cores, wherein the first test inquiry proposes that a first one of the computer cores be tested by a second one of the computer cores; and
in response to both computer cores consenting to the first test inquiry:
putting the first one of the computer cores in a test mode;
sending first test data from the second one of the computer cores to the first one of the computer cores; and
using the second one of the computer cores to check the correctness of test results of the first one of the computer cores after termination of the first test,
wherein the performing of the first test occurs during the driving operation of the motor vehicle and while a first program for executing the driving operation of the motor vehicle is being processed in the second one of the computer cores; and
wherein the computer cores are configured to simultaneously contribute to the driving operation of the motor vehicle when neither of the computer cores is being tested;
wherein the consenting of both computer cores to the first test inquiry includes a determining, during the driving operation of the motor vehicle, by both computer cores that the test inquiry can be performed without disturbing the driving operation of the motor vehicle,
wherein at least one of the computer cores denies consent if one of an engine rotational speed is above a threshold speed and if an immediately previous instance of fuel injection occurred more than a predetermined period of time ago.

18. The method as recited in claim 1, wherein:
at the first one of the computer cores, issuing consent to the first test in response to determining that performing the first test will not disrupt the operating sequence of the machine with respect to processing performed by the first one of the computer cores; and at the second one of the computer cores, issuing consent to the first test in response to determining that performing the first test will not disrupt the operating sequence of the machine with respect to processing performed by the second one of the computer cores.

19. The method as recited in claim 18, wherein the determining by the first one of the computer cores is based on how long ago the first one of the computer cores performed a process.

20. The method as recited in claim 19, wherein the process is a fuel injection process for the motor vehicle.

21. The method as recited in claim 18, wherein the determining by the second one of the computer cores is based on how much computer power is required during the first test.

22. The method as recited in claim 21, wherein the amount of computer power required is determined based on engine speed.

23. The method as recited in claim 10, further comprising:
   determining an urgency of tasks that are intended for execution by the first one of the computer cores, and which arrive during the first test; and
   performing urgent ones of the tasks at the second one of the computer cores, by relaying an interrupt to the second one of the computer cores.

24. The method as recited in claim 23, further comprising:
   storing non-urgent ones of the tasks during the first test; and
   performing the non-urgent tasks at the first one of the computer cores after the first test is over.

25. A method for testing a computer core in a processor having at least two computer cores, the computer cores being interconnected via an internal connecting system, and both computer cores making a contribution toward an operating sequence of a machine, the method comprising:
   performing a first test by:
      posing a first test inquiry to both of the computer cores, wherein the first test inquiry proposes that a first one of the computer cores be tested by a second of the computer cores;
      in response to both computer cores consenting to the first test inquiry:
         putting the first one of the computer cores in a test mode;
         sending first test data from the second one of the computer cores to the first one of the computer cores; and
         using the second one of the computer cores to check the correctness of test results of the first one of the computer cores after termination of the first test,
      wherein the performing of the first test occurs during the operating sequence of the machine and while a first program for executing the operating sequence of the machine is being processed in the second one of the computer cores;
   loading the first test data from a memory into the second one of the computer cores in preparation for the sending of the first test data from the second one of the computer cores to the first one of the computer cores;
   switching the first one of the computer cores to the test mode by the second one of the computer cores in that a scan chain of the first one of the computer cores is made accessible; and
   performing the sending of the first test data by shifting the first test data through the scan chain of the first one of the computer cores with the aid of the second one of the computer cores, therein causing the first computer core to output the test results for the first computer core;
   wherein the step of using the second one of the computer cores to check the correctness of test results of the first one of the computer cores involves a plausibility check;
   wherein the machine is a motor vehicle;
   wherein the consenting of both computer cores to the first test inquiry includes a determining, during a current driving operation of the motor vehicle, by both computer cores that the test inquiry can be performed without disturbing the driving operation of the motor vehicle, and
   wherein at least one of the computer cores denies consent if one of an engine rotational speed is above a threshold speed and if an immediately previous instance of fuel injection occurred more than a predetermined period of time ago.

26. The method as recited in claim 25, wherein the first one of the computer cores does not contribute to the operating sequence of the machine while the first test data is being shifted through the scan chain.

* * * * *